United States Patent
Rana et al.

(10) Patent No.: US 7,783,310 B2
(45) Date of Patent: Aug. 24, 2010

(54) MELTING INFORMATION ON A CLIENT DEVICE

(75) Inventors: Hemendra Rana, San Jose, CA (US); Saurav Chatterjee, San Jose, CA (US); Paul Fullarton, San Jose, CA (US); Josh Perfetto, San Jose, CA (US); Steven D. Schramm, San Jose, CA (US); Ankur Shah, San Jose, CA (US)

(73) Assignee: Orative Corporation, San Jose, CA (US)

( * ) Notice: Subject to any disclaimer, the term of this patent is extended or adjusted under 35 U.S.C. 154(b) by 139 days.

(21) Appl. No.: 11/509,472

(22) Filed: Aug. 23, 2006

(65) Prior Publication Data

US 2007/0049304 A1 Mar. 1, 2007

Related U.S. Application Data

(63) Continuation-in-part of application No. 10/890,922, filed on Jul. 14, 2004.

(60) Provisional application No. 60/487,143, filed on Jul. 14, 2003, provisional application No. 60/710,998, filed on Aug. 23, 2005, provisional application No. 60/711,051, filed on Aug. 23, 2005, provisional application No. 60/711,053, filed on Aug. 23, 2005.

(51) Int. Cl.
*H04Q 7/20* (2006.01)
*H04M 3/42* (2006.01)

(52) U.S. Cl. .................. 455/466; 379/211.02
(58) Field of Classification Search ............ 379/211.02; 455/466
See application file for complete search history.

(56) References Cited

U.S. PATENT DOCUMENTS

| | | | |
|---|---|---|---|
| 5,732,348 A | 3/1998 | Norimastsu | |
| 5,903,629 A | 5/1999 | Campbell | |
| 5,903,882 A * | 5/1999 | Asay et al. ............... | 705/44 |
| 6,092,097 A | 7/2000 | Suzuoka | |
| 6,147,977 A | 11/2000 | Thro | |
| 6,272,214 B1 | 8/2001 | Jonsson | |
| 6,345,288 B1 | 2/2002 | Reed | |
| 6,351,656 B1 | 2/2002 | Burgan | |
| 6,373,817 B1 | 4/2002 | Kung | |
| 6,424,711 B1 | 7/2002 | Bayless | |
| 6,751,297 B2 | 6/2004 | Nelkenbaum | |
| 6,754,181 B1 | 6/2004 | Elliott | |
| 6,920,486 B2 | 7/2005 | Kiiskinen | |

(Continued)

OTHER PUBLICATIONS

International Search Report for Application No. PCT/US06/33181 dated Apr. 25, 2007 (1 Page).

(Continued)

*Primary Examiner*—Rasha S Al Aubaidi
(74) *Attorney, Agent, or Firm*—Tucker Ellis & West LLP

(57) ABSTRACT

Melting information of a client device is described. The device melting includes receiving a melt message at an inbox of a client device. A source of the melt message is authenticated using identification information of the melt message. The client device automatically deletes client state information of the client device in response to authenticating the source of the melt message.

46 Claims, 12 Drawing Sheets

U.S. PATENT DOCUMENTS

| | | | |
|---|---|---|---|
| 7,047,426 B1 * | 5/2006 | Andrews et al. | 713/155 |
| 2003/0120593 A1 | 6/2003 | Bansal | |
| 2004/0248600 A1 | 12/2004 | Kim | |
| 2005/0041647 A1 | 2/2005 | Stinnie | |
| 2005/0068980 A1 | 3/2005 | Mathew | |
| 2005/0272413 A1 | 12/2005 | Bourne | |
| 2006/0141982 A1 | 6/2006 | Timmins | |
| 2007/0022058 A1 * | 1/2007 | Labrou et al. | 705/67 |

OTHER PUBLICATIONS

Written Opinion of the International Searching Authority dated Feb. 26, 2008 (3 Pages).

Written opinion of the International Searching Authority for Application No. PCT/US2006/033181.

PCT International Search Report, International Application No. PCT/US2006/033071, Apr. 20, 2007.

PCT International Search Report, International Application No. PCT/US2007/000487, Oct. 18, 2007.

PCT International Search Report, International Application No. PCT/US2007/007064, Jun. 30, 2008.

* cited by examiner

MELTING INFORMATION ON A CLIENT DEVICE

RELATED APPLICATIONS

This application is a continuation-in-part (CIP) application of U.S. patent application Ser. No. 10/890,922, filed Jul. 14, 2004, which claims the benefit of U.S. patent application Ser. No. 60/487,143, filed Jul. 14,2003.

This application claims the benefit of U.S. patent application No. 60/710,998, filed Aug. 23,2005.

This application claims the benefit of U.S. patent application No. 60/711,051, filed Aug. 23,2005.

This application claims the benefit of U.S. patent application No. 60/711,053, filed Aug. 23,2005.

TECHNICAL FIELD

The disclosure herein relates generally to communication systems and, in particular, to wireless communication systems.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon numerous other types of communications to collaborate with colleagues and drive business success. This is especially true for those in sales, service, operations and management roles who rely upon timely access to and coordination with colleagues as well as other employees, customers, partners and suppliers. Thus, communications remain an essential means of conducting business and staying in contact.

As a result of communications being so critical to business today, many professionals and enterprise employees now handle very large numbers of communications each business day. These communications can include disparate types of communications like emails, voicemails, instant messaging to name a few. Managing these large numbers and disparate types of communications consumes large amounts of time during the typical business day. For the growing number of people who spend a significant part of their day away from their offices or in meetings or other events, managing this large number of communications is highly time-consuming, frustrating and inefficient. Consequently, there is a need for communication systems that provide efficient, timely, and proactive real-time management of multiple types of communications.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Melting information of a client device is described herein. The device melting includes receiving a melt message at an inbox of a client device. A source of the melt message is authenticated using identification information of the melt message. The client device automatically deletes client state information of the client device in response to authenticating the source of the melt message.

In the following description, numerous specific details are introduced to provide a thorough understanding of, and enabling description for, embodiments of the communications systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

A communication system is provided herein that uses client-server architectures to improve the efficiency of multiple types of communications. The communication system, referred to herein as the active mobile collaboration (AMC) system, includes a facilitator. The facilitator of an embodiment is an application hosted on one or more servers or other processor-based devices, and communicates a portable or mobile communications device via one or more couplings. The facilitator communicates with the AMC client of a host portable device via a network coupling for example. The facilitator of alternative embodiments can be distributed among one or more portable processor-based devices including the same communication devices as the client application.

The AMC system also includes a client. The client, also referred to as the AMC client, is a component application of a variety of processor-based mobile communication devices and telephones. The components of the AMC system function to improve efficiency of communications by allowing communication device users to increase accessibility of enterprise and personal contact information from mobile phones and other personal digital assistants (PDAs), dynamically manage how and when mobile communications take place, intelligently screen messages, regardless of message type, based on identity of a messaging party, urgency, and subject matter, and determine which contacts in a directory are available to talk and which ones choose not to be disturbed, to name a few.

Figure 1:
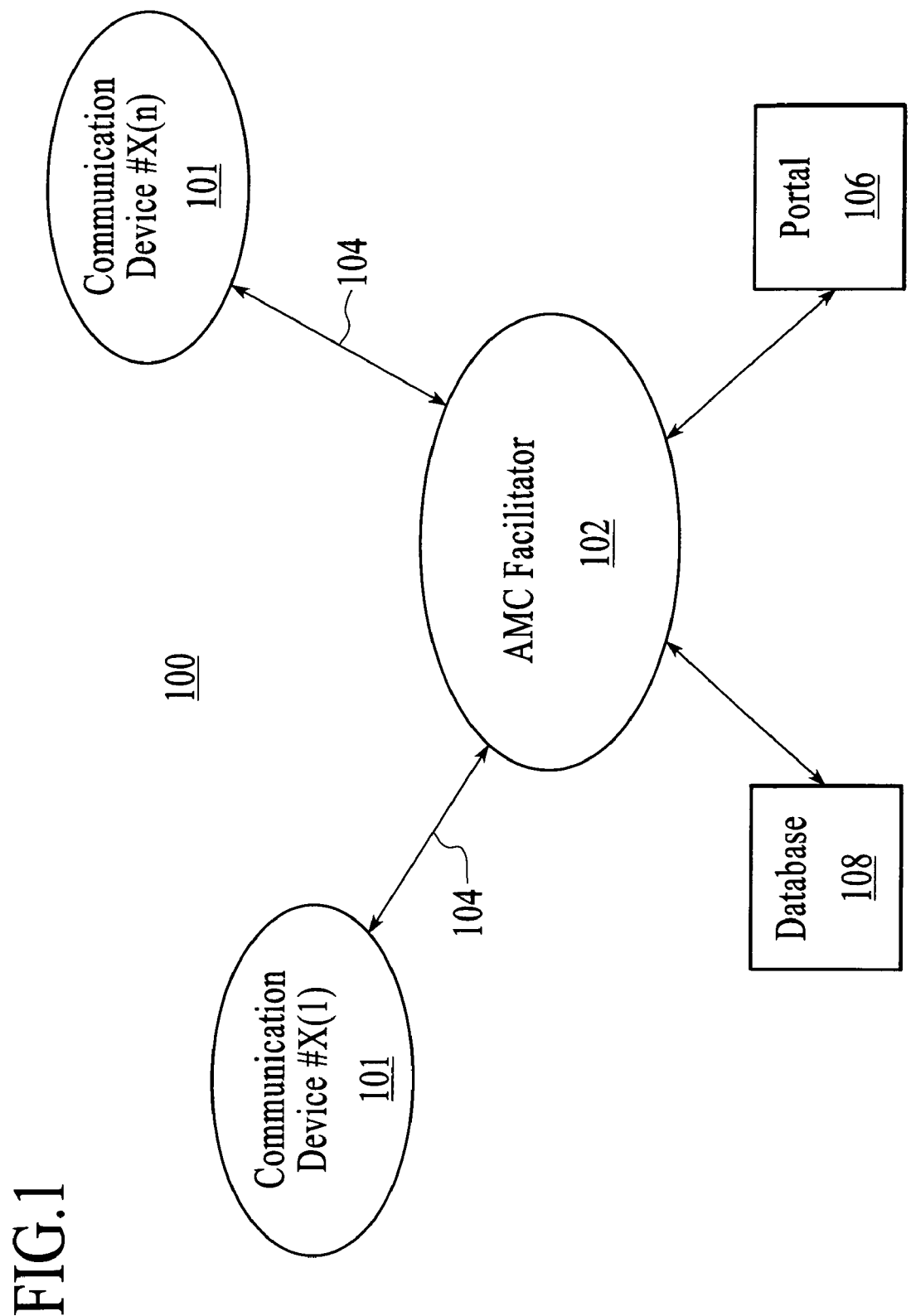
FIG. 1 is a block diagram of an active mobile collaboration (AMC) system, under an embodiment.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC server 102, includes a facilitator application. The AMC client and facilitator function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations.

The communication devices 101 described herein include processor-based electronic devices, for example, cellular telephones, personal computers; portable computing devices, portable telephones, portable communication devices, subscriber devices or units, PDAs, mobile devices, wireless devices, wireline devices, voice over Internet Protocol (VOIP) devices, private branch exchange (PBX) devices, soft clients, and desktop clients to name a few. The communication devices 101, also referred to as handsets, client devices, mobile devices, mobile communication devices, and portable communication devices, can include all such devices and equivalents, and are not limited to the communication devices described above.

The couplings 104 include wired couplings, wireless couplings, and hybrid wired/wireless couplings, but are not so limited. Furthermore, the couplings 104 can include various networks and/or network components (not shown) of a communication service provider or carrier, but are not so limited. The network and corresponding network components, when present in the couplings 104, can be any of a number of network types known in the art including, but not limited to, local area networks (LANs), metropolitan area networks (MANs), wide area networks (WANs), proprietary networks, backend networks, and the Internet.

Figure 2:
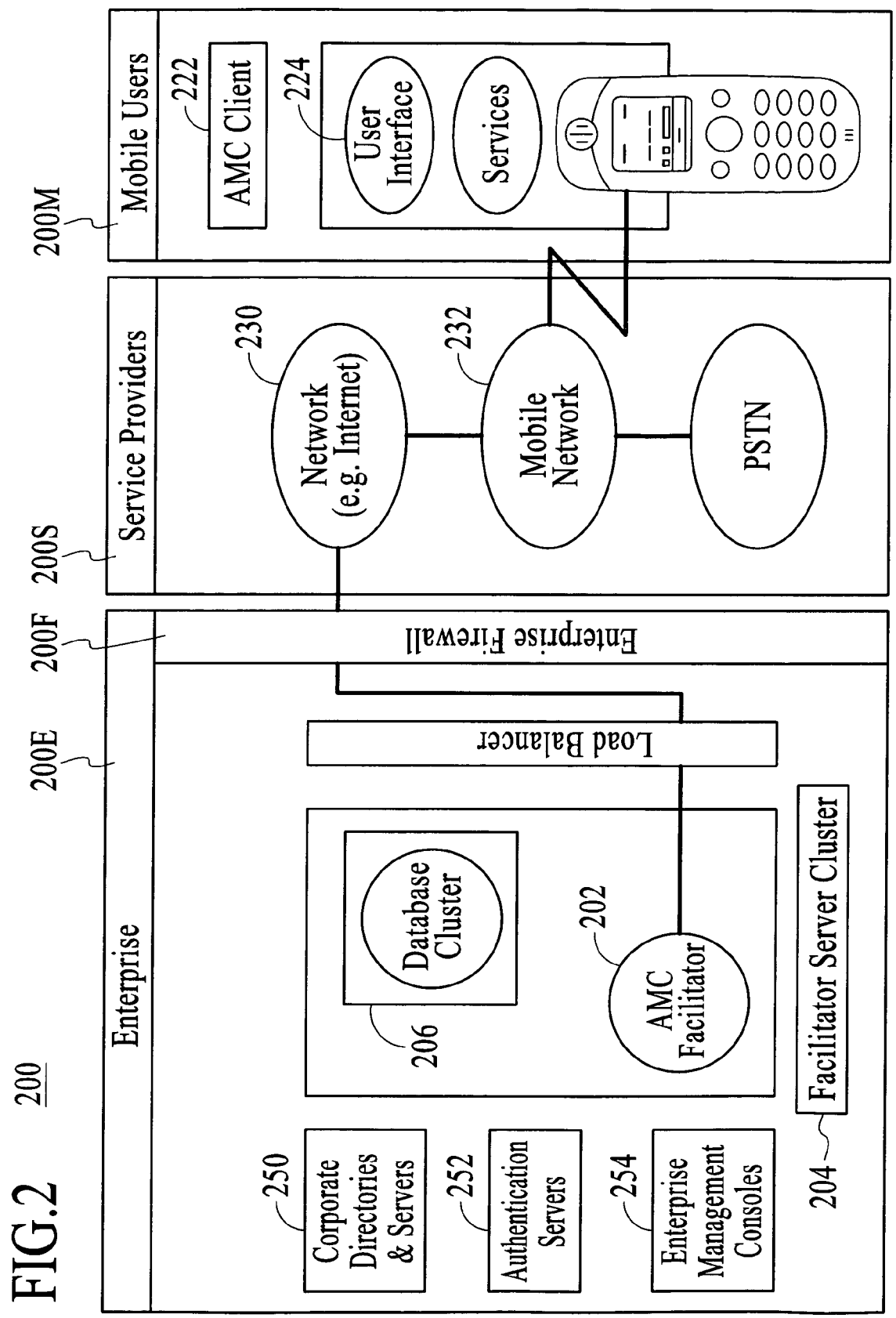
FIG. 2 is a block diagram of a communications system that includes an AMC system, under an alternative embodiment.

FIG. 2 is a block diagram of a communications system 200 that includes an AMC system, under an alternative embodiment. The AMC system includes a facilitator 202 and a client 222 as described elsewhere herein. The facilitator 202 can be one or more facilitators that form a facilitator server cluster 204 and/or database cluster 206 within the enterprise 200E that are resident behind the enterprise firewall 200F, but the AMC system is not so limited. The host enterprise 200E also includes numerous other components, for example, corporate directories and servers 250, authentication servers 252, and enterprise management consoles 254 to name a few. The facilitator 202 is an integrated component of the host enterprise 200E and as such integrates with one or more components of the enterprise 200E. For example, couplings between the facilitator 202 and messaging and collaboration servers (e.g. Microsoft® Exchange) and/or corporate or other directories of the enterprise 200E allow easy, over-the-air download of personal and corporate contact information to devices, as well as searching of personal and corporate contact directories from the device. Other information of the enterprise 200E can also be delivered to the devices using the AMC system, information including but not limited to calendar information, calendar alerts, calendar reminders, etc.

The facilitator 202 couples to a device of one or more users via one or more network couplings. As an example, the facilitator 202 couples to devices using one or more service provider networks 200S. In this example, the facilitator 202 couples to one or more service provider networks or infrastructures 200S via network couplings 230 (e.g. Internet), and then couples to devices 200M via the respective service provider networks 232. The AMC system protects data transfers between the facilitators 202 and the devices 200M using secure couplings, for example, protected with end-to-end security protocols like Secure Sockets Layer (SSL) or Transport Layer Security TLS cryptographic protocols.

The devices 200M of an embodiment include the AMC client 222. The AMC client 222, also referred to as the client 222, includes a graphical user interface 224 that integrates with the device applications and allows users to receive and scan enterprise information of the enterprise 200E. The enterprise information includes contact information, directory information, alerts that can include calendar reminders, conference notifications and call requests from colleagues, as described herein and in the Related Applications. Call requests include relevant details such as name, urgency, and subject matter to help users move business forward while screening out unwanted interruptions. The client 222 further provides a presence-aware phonebook that lets users find a contact and determine if the contact is available to talk, even before placing a call. The client 222 eliminates the need to manually enter contacts into the host device 200M. Instead, users download personal and/or corporate contact information over-the-air to their devices. The facilitator 202 and client 222 of the AMC system therefore provide automated, two-way synchronization to ensure contacts are backed up and up to date at the enterprise 200E.

An example of the AMC system of an embodiment is available as the Orative Enterprise Software from Orative Corporation of San Jose, Calif. The facilitator is available as the Orative Enterprise Server (e.g. runs on a standards-based, Java 2, Enterprise Edition (J2EE) platform that operates securely behind the enterprise firewall). The client is available as the Orative Client Software (e.g. runs on a variety of popular mobile devices, and leverages the latest application development environments including Symbian OS, Java and BREW to name a few).

While dynamically managing how and when mobile calls take place and intelligently screening calls based on numerous factors described above, the components of the AMC system also improve efficiency of voice communications by increasing accessibility of enterprise and personal contact information from mobile phones. Components of the AMC system of an embodiment support aggregation and management of contact information from various sources including, but not limited to, directories resident on desktop computers, corporate/enterprise directories, and contact information of the mobile device native phonebook, and provide data coupling between those sources and mobile devices hosting the AMC client. This contact information is managed by providing the user with access via the mobile device to dynamically integrated contacts of a contact list and a number of phonebooks from multiple sources. The dynamic integration of multiple disparate directories provided by the AMC system of an embodiment allows a user to indicate the contacts he/she desires among all directories of a corresponding enterprise server, and then dynamically synchronizes all enterprise directories so as to place the desired information from the directories together into a common AMC phonebook, as described in detail below.

Figure 3:
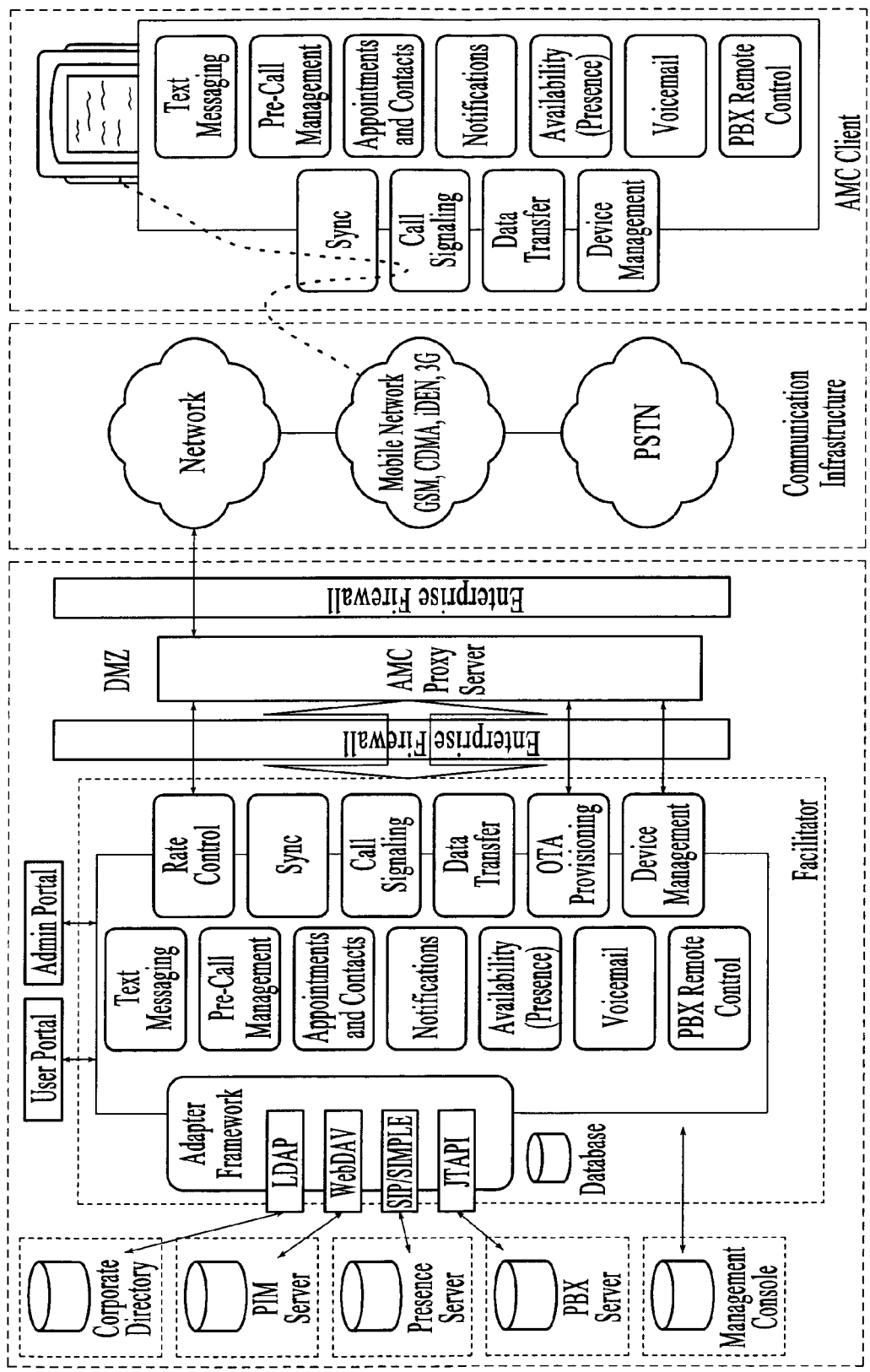
FIG. 3 is a block diagram of a communications system that includes an AMC system, under another alternative embodiment.

FIG. 3 is a block diagram of a communications system 300 that includes an AMC system, under another alternative embodiment. The communications system 300 includes enterprise components, with which the AMC system is integrated, coupled to client devices via a communication or network infrastructure. The enterprise components include, but are not limited to, one or more of a corporate directory, Personal Information Manager (PIM) server, presence server, Private Branch Exchange (PBX) server, and management console.

The AMC system includes a facilitator as described herein. The facilitator includes an adapter or adapter framework by which the facilitator simultaneously integrates with components of the enterprise and enterprise servers. The facilitator uses an adapter for each directory server to which it integrates. The adapter of an embodiment is a protocol-specific adapter for each directory server to which it integrates; alternatively, the adapter includes vendor-specific adapters. The facilitator integrates with multiple directories simultaneously, including Lightweight Directory Access Protocol (LDAP)/Active Directory, Exchange, Domino, and third-party instant message (IM)/presence server buddy-lists. The AMC adapters convert the data from the enterprise directories (e.g. external) into a common data structure. The converted data is coalesced together into a single directory presented to the user on device via the client. The single directory generated from the data of multiple directories is referred to as the AMC phonebook.

The facilitator includes one or more applications that support multiple functions provided by the AMC system. The AMC system functions include, but are not limited to, test messaging, pre-call management, appointments and contacts, notifications, availability (presence), voicemail, and PBX remote control.

The facilitator couples to a mobile device of one or more users via one or more network couplings or infrastructures. As an example, the facilitator couples to a mobile network using a coupling with another communications network (e.g. Internet). The mobile network or mobile infrastructure, which includes one or more service provider networks associated with respective ones of the mobile devices, provides a coupling to individual mobile devices.

Communications between the facilitator and the mobile device are controlled by the facilitator using one or more components and applications. The functions provided by the facilitator in controlling communications include one or more of rate control, synchronization (sync), call signaling, data transfer, OTA provisioning, and device management to name a few. Optionally, the communications path between the facilitator and the communications network includes an AMC proxy server.

People travel with their portable devices everyday and some of these people mistakenly leave them behind on trains, buses, and restaurants. Similarly, the portable devices are sometimes stolen. Because AMC system subscribers will have enterprise data on their portable device, losing a portable device becomes a security issue for the user as well as for the enterprise. The AMC system of an embodiment includes a melt component that enables the user or enterprise administrator to send a command to the portable device to "melt" or erase the AMC system state information hosted on the device. The AMC system state information that is erased includes, but is not limited to, the client datastore, user identification, password, and server information to name a few.

The ability to melt or erase system state information from a portable device is most useful when the device is mistakenly left behind or lost because the AMC system client state can be melted before someone other than the subscriber retrieves the phone and compromises information of the device. When a situation arises requiring melting of a portable device, the user or a system administrator of the host enterprise can use the portal of the facilitator of an embodiment to initiate melting of the client state information on the lost or stolen portable device.

Melting fully erases client state information on the target device. Although the client state is fully erased following a melt, no subscriber information or history is lost because this information is preserved on the enterprise server and/or the facilitator. Consequently, by re-provisioning and re-synchronizing the portable device, as described below, the AMC client can recreate melted data when a device is recovered by the user. The re-provisioning and re-synchronizing require the user to enter his username and password in order to ensure that one recreating melted data is the user/owner of the device.

Figure 4:
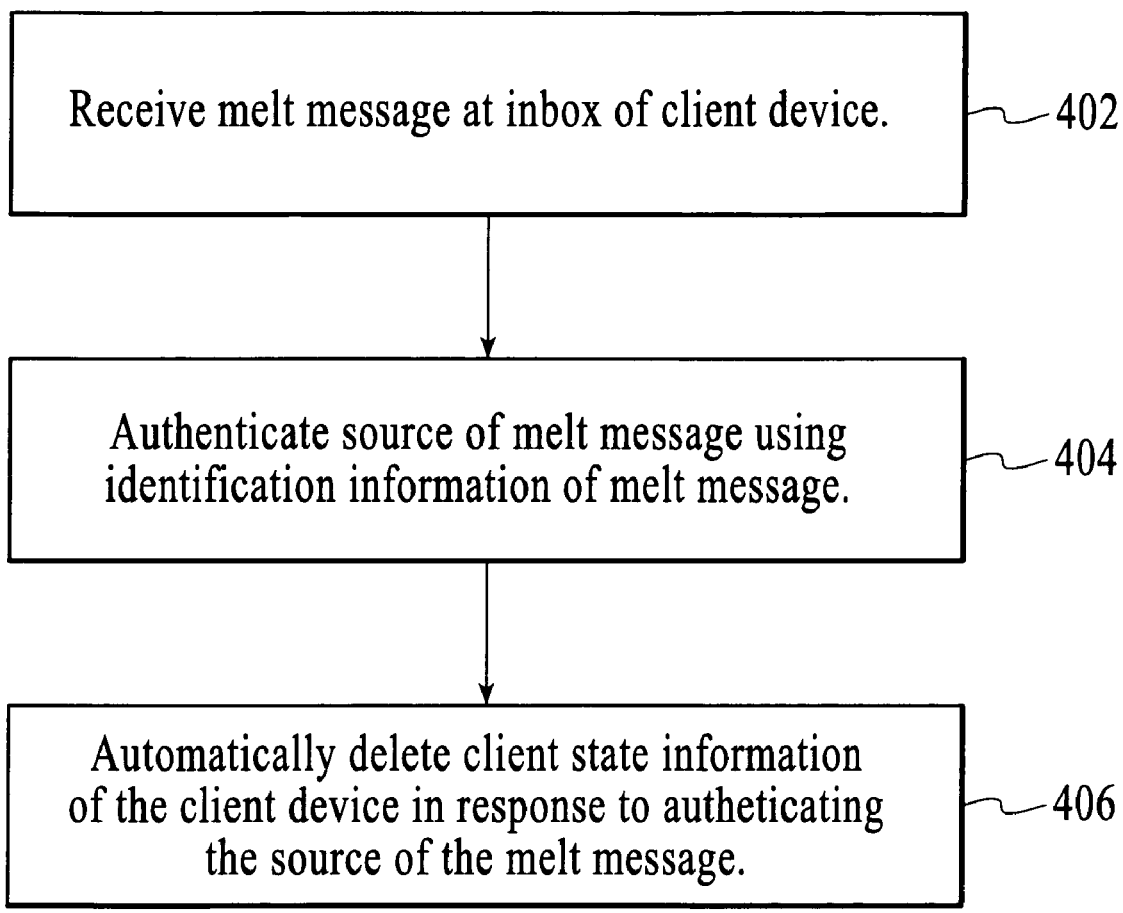
FIG. 4 is a flow diagram of device melting, under an embodiment.

FIG. 4 is a flow diagram of device melting 400, under an embodiment. The device melting 400 includes receiving 402 a melt message at an inbox of a client device. A source of the melt message is authenticated 404 using identification information of the melt message. The client device automatically deletes 406 client state information of the client device in response to authenticating the source of the melt message.

To initiate melting of a device of an embodiment, the user (or system administrator) accesses the facilitator by logging in to a portal and inputting information to delete/inactivate the device that is targeted for melting. Upon receiving this electronic instruction from the use, the server flags or in some other manner indicates that the targeted device is being "DELETED".

Under the melting of an embodiment, the facilitator sends or transmits a message to a component of the target device that instructs the AMC client of the device to melt the data of the device. The message of an embodiment, referred to herein as a melt message, is a push message but is not so limited. The push message can be any type of electronic message, for example, an SMS message, email message, or any other type of device-specific push mechanism or message. The push message used in the description herein is an SMS message, but alternative embodiments can use other message types.

The melt message includes a private key, which serves to identify the source and a public key, which serves to identify which client application on a device should parse the message. The melt message private key of an embodiment is a pseudo-random number like a Globally Unique Identifier (GUID), referred to herein as the melt GUID. The melt message of an example SMS message takes the form t=pRn2Qn5;ty=melt;melt_guid=<GUID> where "melt_guid" is the private key, "ty" indicates it is a 'melt' message, "t" is the public key, but is not limited to this form. The GUID, which is unique to a client device, is also stored in the client device as communicated from the facilitator to the client simultaneous or subsequent to device provisioning, as described below. The public key is the same for all AMC clients communicating with an AMC facilitator. Upon receiving the melt message, the client validates the message source by comparing the GUID of the melt message with the GUID stored in the device. The validation includes validating the source of the message, but is not so limited. Once the melt message is validated, the client melts the data of the device. The client searches only for messages with the public key for faster searching of messages in a common inbox.

Apart from sending the message, the facilitator also disconnects the client, if it was connected, and removes any persistent session that it maintains for this device, therefore requiring the client to authenticate the next time it attempts to connect to the facilitator. Persistently connected clients are designed to re-connect immediately if the connection is broken.

The client can optionally notify the facilitator of both receiving the melt message and after melting the client state. To notify the facilitator of the former, it may send a message back to the facilitator immediately after it receives the message; it may again send a message back, with a status, after it attempts to melt the client state.

If the facilitator does not receive a reply message of the first type within a pre-specified period of time, it may re-send its message, optionally until it does receive a reply or the client device connects to the facilitator.

If the client never receives the message, or if it does not support push messages, the data will be melted when it attempts to connect to the facilitator next time. Because it removed the persistent session for this client, if any existed, and disconnected the client if it was connected, the client is forced to authenticate itself at this time.

The client connects to the facilitator and first sends information including the session identification (e.g. sessionId) of the client. The facilitator receives and verifies that the session identification corresponds to a client device that has been melted and, in turn, sends a handshake response back to the client device. The handshake response message includes a distinct status code (e.g. LOGOUT OML message with code 15, DELETED_DEVICE) as described above. The client starts melting the device upon receiving the message with the distinct error code.

If the client sends a session identification to the facilitator that is not being tracked by the facilitator, the facilitator is unable to verify the session identification. The client then authenticates itself by sending an authentication message to the facilitator. An example authentication message (e.g. AUTH_START message) is as follows:

```
<AUTH_START_CS>
    <password>test01</password>
    <user_name>d1</user_name>
    <time>19939393939</time>
    <resource>d2</resource>
    <auth_type>basic</auth_type>
</AUTH_START_CS>
```

Because this client device is inactive, the facilitator fails to authenticate this client device and, in response to the client device attempt to authenticate itself, sends a response message to the client device that includes a distinct error code (e.g. LOGOUT OML message with code 15, DELETED_DEVICE) as described above. The AMC client starts melting the device upon receiving the message with the distinct error code. An example response message (e.g. AUTH_COMPLETE message) to the client device self-authentication message is as follows:

```
<AUTH_COMPLETE_CS>
    <time>10002020202</time>
    <result_code>15</result_code>
    <result_string>The Device no longer exists in the database</result_string>
</AUTH_COMPLETE_CS>
```

In melting operations of an alternative embodiment, the facilitator determines if the client device is currently connected with the facilitator. If a connection exists between the facilitator and the client device, the facilitator sends or transmits a message including a distinct status code to the device. The message includes, for example, an Outline Markup Language (OML) message (e.g. LOGOUT OML message with code 15, DELETED_DEVICE). An example of the message follows as

```
<LOGOUT>
    <result_code>15</result_code>
</LOGOUT>
```

Apart from sending the message, the facilitator also removes any persistent session that it maintains for this device. The client initiates melting upon receiving this message.

When the facilitator determines the client device is currently not connected, the facilitator attempts to send an application-directed message (e.g. SMS) to the client device (regardless of whether the device is an active device). However, if the target device is an active device, the facilitator also removes the persistent session that it maintains for the target device, thereby forcing the target device to authenticate with the facilitator the next subsequent time the target device connects with the facilitator).

The client, upon receiving the application-directed message from the facilitator, attempts communication with the facilitator by sending information including the session identification (e.g. sessionId) of the client. The facilitator receives and verifies that the session identification corresponds to a client device that has been melted and, in turn, sends a handshake response back to the client device. The handshake response message includes a distinct error code (e.g. LOGOUT OML message with code 15, DELETED_DEVICE) as described above. The client starts melting the device upon receiving the message with the distinct error code.

If the client sends a session identification to the facilitator that is not being tracked by the facilitator, the facilitator is unable to verify the session identification. The client then authenticates itself by sending an authentication message to the facilitator. An example authentication message (e.g. AUTH_START message) is as follows:

```
<AUTH_START_CS>
    <password>test01</password>
    <user_name>d1</user_name>
    <time>19939393939</time>
    <resource>d2</resource>
    <auth_type>basic</auth_type>
</AUTH_START_CS>
```

Because this client device is inactive, the facilitator fails to authenticate this client device and, in response to the client device attempt to authenticate itself, sends a response message to the client device that includes a distinct error code (e.g. LOGOUT OML message with code 15, DELETED_DEVICE) as described above. The AMC client starts melting the device upon receiving the message with the distinct error code. An example response message (e.g. AUTH_COMPLETE message) to the client device self-authentication message is as follows:

```
<AUTH_COMPLETE_CS>
    <time>10002020202</time>
    <result_code>15</result_code>
    <result_string>The Device no longer exists in the
    database</result_string>
</AUTH_COMPLETE_CS>
```

For clients in a persistent connection mode, the facilitator does not send an application-directed message to the client when the client device is melted. As such, if a client device is targeted for melting on the facilitator via an input of the user or system administrator, the client device is not melted until the device connects to the facilitator and attempts to authenticate. Therefore, because this client device is inactive, the facilitator fails to authenticate this client device and, in response to the client device attempt to authenticate itself, sends a response message to the client device that includes a distinct error code (e.g. LOGOUT OML message with code 15, DELETED_DEVICE) as described above. The AMC client starts melting the device upon receiving the message with the distinct error code.

The AMC system of an embodiment includes a provisioning server or component for use in providing services of the AMC system to users of devices. The provisioning server, which can be a component of the facilitator, provides over the air (OTA) provisioning and re-provisioning of a device. Provisioning and re-provisioning includes transferring to and installing on the device a third-party application and configuring this application. Provisioning of the AMC system uses a single provisioning message in a one-step process; this one-step provisioning is in contrast to the multi-step provisioning of typical systems. The provisioning system, using only end user-supplied information of a type of a target device, the device phone number or unique name or address, and service provider, automatically performs device configuration. Thus, the provisioning of an embodiment involves minimal end-user inputs or actions, and does not require any non pre-installed software to be hosted on the device to support the provisioning.

Figure 5:
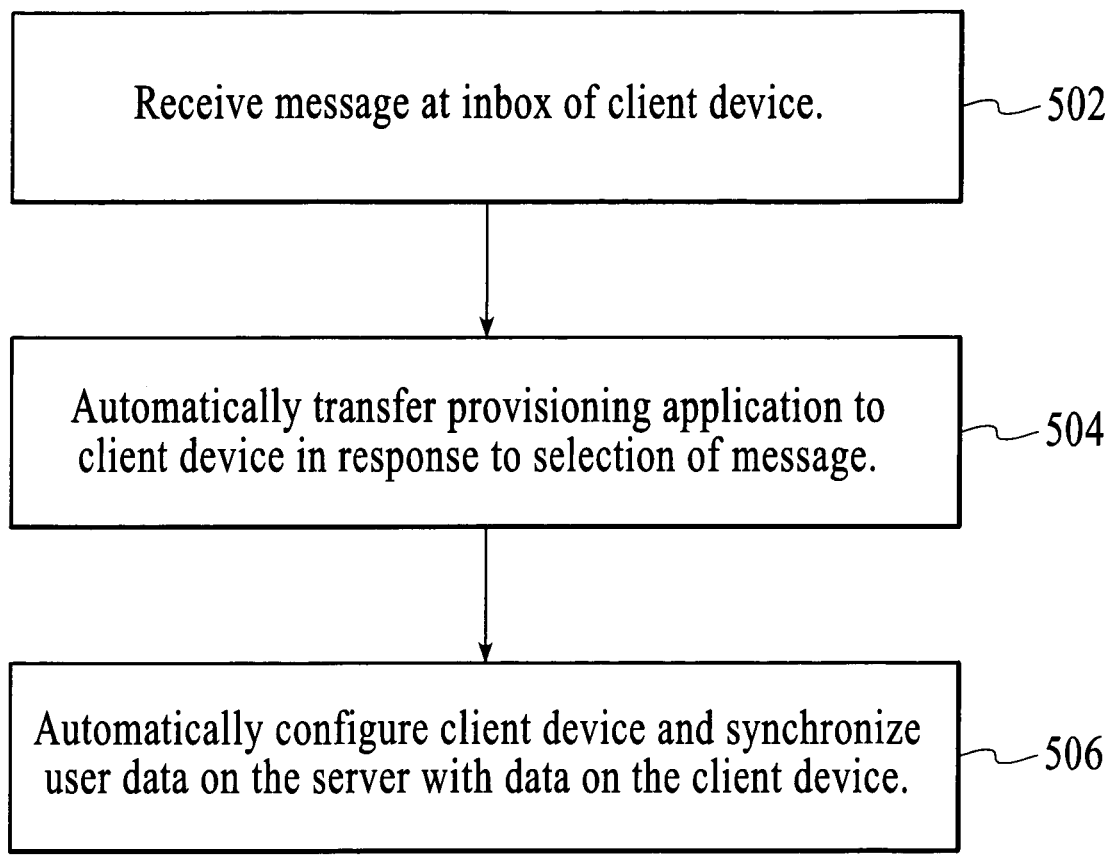
FIG. 5 is a flow diagram for provisioning, under an embodiment.

As an example of provisioning, FIG. 5 is a flow diagram 500 for provisioning, under an embodiment. The provisioning 500 includes receiving 502 a message at an inbox of a device. The message includes information of an electronic location of the provisioning server from which to download the appropriate application and device and user-specific information used for configuration of the application. An application is automatically transferred 504 to the device in response to selection of the received message by a user of the device. The application is automatically installed on the device. The application is auto-started, at which time it self-configures 506 using the original message.

The provisioning server, as a component of the facilitator, can be integrated with the host enterprise servers, but is not so limited. The provisioning includes a download component and a configuration component that is activated automatically via one user step. The provisioning server performs provisioning using archive resource information received from the application provider or any other service provider. The archive resource information can be in an archive resource file that includes applications for various device types, supported target devices and operators/service providers that support target devices, and device and service provider configuration information.

The provisioning server is generally configured to transmit a push message to the device. The push message includes information like, for example, provisioning server and facilitator server locations (host names and ports), user name of user to provision, and device and service provider configuration information, etc. The push message can be any message type including, but not limited to, an SMS message, email message, or any other message type accepted by a particular target device. A device is targeted to receive the message using the device phone number or any other unique device identifier, e.g. IP address, MAC address, or name. The target device of an embodiment receives the push message in a message or push inbox. In response to a user selecting or "clicking" information of the received push message, the device browser downloads the client to the device; on some devices user selection is not necessary if a secret phrase is known or if the message is sent from a authenticated user with specific permissions. Following the download, the application is installed on the device. The application then retrieves the push message from the inbox, parses the text of the message, and configures itself using information of the message, as described in detail below.

The provisioning server hosts the applications that can be or are available for download. A provisioning portal serves as the user interface front-end to the provisioning server, and can be linked from a section of the user portal and from the admin portal of the facilitator. A user desiring to configure a device for use with the AMC system enters via the portal the device name, phone number, service provider, and handset model; the service provider and model are entered using pull-down lists but the embodiment is not so limited.

In response to the information received from the user through the portal, the facilitator (e.g. provisioning server) generates and transmits a push message to the device. The push message can be any type of electronic message, for example, an SMS message, email message, or any other type of device-specific push mechanism or message. The push message used in the description herein is an SMS message, but alternative embodiments can use other message types. The message includes both the URL of the location of the provisioning server, from where the handset can download the software, the URL of the location of the facilitator, to which the application may connect after it is configured, and user- and device-specific information needed for configuration.

An example URL of an embodiment includes but is not limited to the following form:

```
http://<provisioning server
hostname>:<port>/p?t=<string>&d=<deviceid>&u=<username>&p=
<facilatator_port>&a=<access_point>&s=<0 |
1>&h=<facilitator_hostname>
``` but the URL of various alternative embodiments can include different types and/or combinations of parameters. The variables of the URL represent but are not limited to the following parameters: "provisioning server hostname" represents or includes information of the hostname of the provisioning server; "port" represents or includes information of the provisioning port; "d" represents or includes information of the new identification of the device being provisioned; "u" represents or includes information of the username of the user; "h" represents or includes information of the hostname of the facilitator, "p" represents or includes information of the port to be used for connections by the provisioned client to the facilitator; "a" represents or includes information of the default access point string (the client does a case-insensitive match); "s" represents or includes information of the scheme indicating a SSL client-facilitator coupling ("1") or a non-SSL client-facilitator coupling ("0"); "t" represents or includes information of a public key agreed upon by the client application and facilitator to enable the application to quickly find the facilitator-generated provisioning message in the device inbox. In an alternative embodiment, the s parameter, instead of presenting a binary option between two known protocols, will simply specify the protocol to use.

In system deployments of an embodiment, the provisioning server and facilitator server are both behind (reverse) proxy servers, load balancers, and/or NATs. In this configuration, the provisioning server and facilitator hostname and port information reference the publicly available server (e.g. proxy, load balancer and/or NAT) and these servers are in turn configured to direct the connection to the appropriate hidden server(s). In other cases, some devices can be outside the firewall while other devices can be inside the firewall, in which case the facilitator and provisioning hostname and ports are dynamically determined by the provisioning server in the generated message based on additional information about the placement of the device relative to the network topology. In other cases, the hostname and ports can be the same in both cases, but the name resolution of hostnames is different for the two scenarios due to the two using different name resolution servers (e.g., DNS servers).

The SMS contents are wrapped or embedded in text to make the contents relatively user-friendly but the embodiment is not so limited. An example SMS message is as follows:

"Go to http://shadow.orative.net: 8080/ p?t=tj3fds3&d=5&u=saurav&p=5443&a=MediaN et&s=1"&h=trial.orative.net In case the SMS message never reaches the target device, the provisioning portal re-transmits the SMS message. For example, an SMS message that is undelivered can be resent once every minute, but is not so limited.

Upon arrival at the target device, the SMS message is placed in a mailbox or inbox. The mailbox includes, for example, an SMS inbox or push inbox, but is not so limited. The user or subscriber selects or opens the SMS message and clicks on or selects the URL in the SMS message; a portal wizard of the AMC system is configured to provide help and/or troubleshooting information to help the subscriber "click" on the URL in the SMS message. Selection of the URL launches the device web browser which couples or connects to the facilitator (e.g. provisioning server). The provisioning server, when detecting with the connection and request from the target device, determines the application that corresponds to the device using information of the username and device id of the device, and transmits the appropriate application to the device.

In an alternative embodiment, the application is not downloaded over the air (OTA) to the client device but is instead downloaded to a computer and then transferred to the client device via another mechanism like Bluetooth, electronic mail, etc. In yet another embodiment, the client application is downloaded from a server separate from the provisioning server. Once the application is received, the configuration is performed using the push message generated by the provisioning server as described herein.

Upon downloading the application from the facilitator (e.g. provisioning server), the device browser invokes the device installer to install the application, which then automatically starts executing. The application searches the SMS inbox and identifies the latest SMS message with the provisioning string (e.g. "tj3fds3"), and parses the SMS of the identified message for information that includes, but is not limited to, the access point, username, deviceid, port, scheme, and hostname. The AMC system URL is constructed as follows:

<scheme>':/'<facilitator_hostname>':'<p> where "scheme" represents an actual protocol (in one embodiment) or includes one of two protocols, either 'orative' or 'oratives' depending on the binary value of 's'. If the executing application cannot find a message that includes the provisioning string in the SMS inbox, the application cannot be provisioned; an error message is indicated on a dialog box of the device and the user can optionally reinitiate the full provisioning.

In an alternative embodiment, instead of the application searching the inbox for a message, the device directs the push message to the client application. Generally, these are denoted as application-directed push messages and the push message includes an identification that matches the identification of the application, but the embodiment is not so limited.

Once the application locates and identifies a provisioning string, the application prompts the user via the device UI to configure the application with the information. If the user selects "No" as the response to the provisioning prompt, the application is not configured and instead exits; the same process then re-occurs the next subsequent time the application is restarted.

The information required for configuration and connection to the facilitator, except the user password, is provided by the provisioning server-generated message. The user enters his/her password from the device.

After configuration is complete, the application couples to the facilitator and negotiates capabilities (i.e., sends a CN_REQ_CS message in OLWP). The User Agent string in the CN_REQ_CS message includes the official software build number. The application also sends to the facilitator the username, password and device identification (e.g. deviceid) in an AUTH_START_CS message.

Once the user logs in and is authenticated, a "handset" OML message is sent to the application as part of the regular synchronization. An example OML message is as follows:

```
<HANDSET>
<name>NAME</name>
<phone_number>PHONE</phone_number>
<service_provider>SP</service_provider>
<model>MODEL</model>
<secret_phrase>SECRET_PHRASE</secret_phrase>
</HANDSET>
``` where "NAME" represents the device name as entered on the provisioning portal, "PHONE" represents a telephone number of the device as entered on the provisioning portal, "SP" represents the service provider as entered on the provisioning portal, "MODEL" represents a model of the device as entered on the provisioning portal, and "SECRET_PHRASE" represents a globally unique identifier (GUID) generated on the facilitator.

The device state may be changed on a device subsequent to device provisioning if the user changes the phone number of the device. This field, and the description field, can be changed via the user portal, and the update information is propagated to the appropriate device.

If editing information of a device from a facilitator portal, the user has the option to change the phone number of the device. If the phone number is changed (e.g., the SIM card is replaced), the application only receives a configuration state update and is not required to be re-installed. If the user changes to a different service provider (the access point changes) subsequent to provisioning the device, an SMS is sent to the phone from the server with the new access point information.

The provisioning server is seeded with data from an Archive Resource (AR) file. The AR file, which is received from a provider, includes application software for supported target devices, information of target devices and operators/service providers, service provider access points and other such service provider information, device model information, documentation, etc. More specifically, the AR file includes information of the list of devices supported, their configuration, documentation, and their respective AMC client application software. The AR file may be updated by a provider as the devices, configuration, and/or software changes. Updates to the AR file can be conveyed to customers via numerous mechanisms like, for example, CDs or email. Additionally, the AR file is made available for download from a web site; the provisioning server can connect to this website and automatically download the latest AR file when it is available.

When the facilitator and provisioning server determine that a software application update is available, it notifies each user of the update. The user can then re-provision to get an update. Because all user data is persisted on the facilitator, reconnecting and re-authenticating retrieves the state.

Provisioning includes installing the application on a device, configuring the application, and synchronizing the user's data using the installed application, as described above. Installation is supported using a native Symbian installer program of the device but is not so limited. Configuration and synchronization information is provided via a Provisioning View of the device UI provided by the AMC client.

An example follows of application installation on a device. This example includes use of the Orative Enterprise Software from Orative Corporation of San Jose, Calif., but the provisioning of an embodiment is not limited to this system and/or this example. A user goes to the user portal to 'add a new device.' Here he enters the handset model, service provider, and phone number and name. The provisioning server generates a SMS message and pushes it out to the device. The user then invokes this message on the device, which downloads the application onto the device. The native installer installs the Orative client on the device.

Once the application is downloaded and installed, it is considered to be in an un-provisioned state. There are three possible provisioning states of an embodiment. The application starts up and behaves according to its current provisioning state. In the un-provisioned state, the application generates the Provisioning View and searches for the provisioning SMS. In a provisioning state, the application displays the Provisioning View via the device UI and synchronizes data with the Orative server (facilitator) based on the connection and account settings stored from the provisioning SMS. In a provisioned state, the application displays the home view via the device UI.

The Provisioning View is displayed on the device when the application is started in un-provisioned or provisioning states. The functions of the Provisioning View are to configure and synchronize the user's data. The Provisioning View includes status indicators displayed in a status bar as with other views in the application. Provisioning status text is displayed in a pre-specified area or region (e.g. top) of the device screen.

When the application is in the un-provisioned state, it causes the Provisioning View to be displayed and it searches the Messaging Inbox of the host device for the most recent SMS message including the account information of the user. The Orative Client uses the most recent provisioning SMS found in the Messaging Inbox of the device messaging application. The application causes a status message (e.g. "Scanning Inbox for SMS . . . ") to be displayed while searching for the SMS message.

If the application cannot find the SMS, it causes an error message (e.g. "Provisioning SMS not found. App will exit.") to be displayed. The application exits or ceases operation following display of the error message.

If the application finds the SMS, it prompts the user to confirm the account information and causes a status message (e.g. "Verifying account . . . ") to be displayed. The application also causes a confirmation dialog to be displayed that includes a user prompt to confirm or reject settings (e.g. "Provisioning for username. Accept?"). If the user confirms the settings the application continues provisioning; if the user rejects the settings in response to the prompt, the application exits.

Following confirmation of settings, the user is prompted for his/her password (e.g. "Please enter your password to access Orative"). If the user cancels out of the password prompt, the application exits. If the user enters a password, the application continues the provisioning. The application attempts to connect to the facilitator using the access point provided in the provisioning SMS, and causes a status message (e.g. "Connecting to server . . . ") to be displayed. If the access point is not found, a dialog is displayed to let the user choose an access point.

When the application is in the provisioning state, it attempts to connect to the provisioning server, login to the user's account and synchronize the user's data to the handset. If the connection to the server cannot be completed due to failure or due to timeout, the application causes an error message to be displayed and changes the status text (e.g. "Waiting to retry . . . "). The application then delays a pre-specified period of time and following the delay re-attempts connecting with the provisioning server. This gives the user an opportunity to correct any connection errors such as changing the access point.

When the application establishes a connection to the provisioning server it causes the status to be changed (e.g. "Authenticating . . . "). If authentication fails, the application disconnects, and causes an error message (e.g. "Authentication failure. Please try your password again.") to be displayed. If authentication succeeds, the application causes the status to be changed (e.g. "Completing provisioning . . . ") When the provisioning process completes, the application causes the Home View to be displayed.

Figure 6:
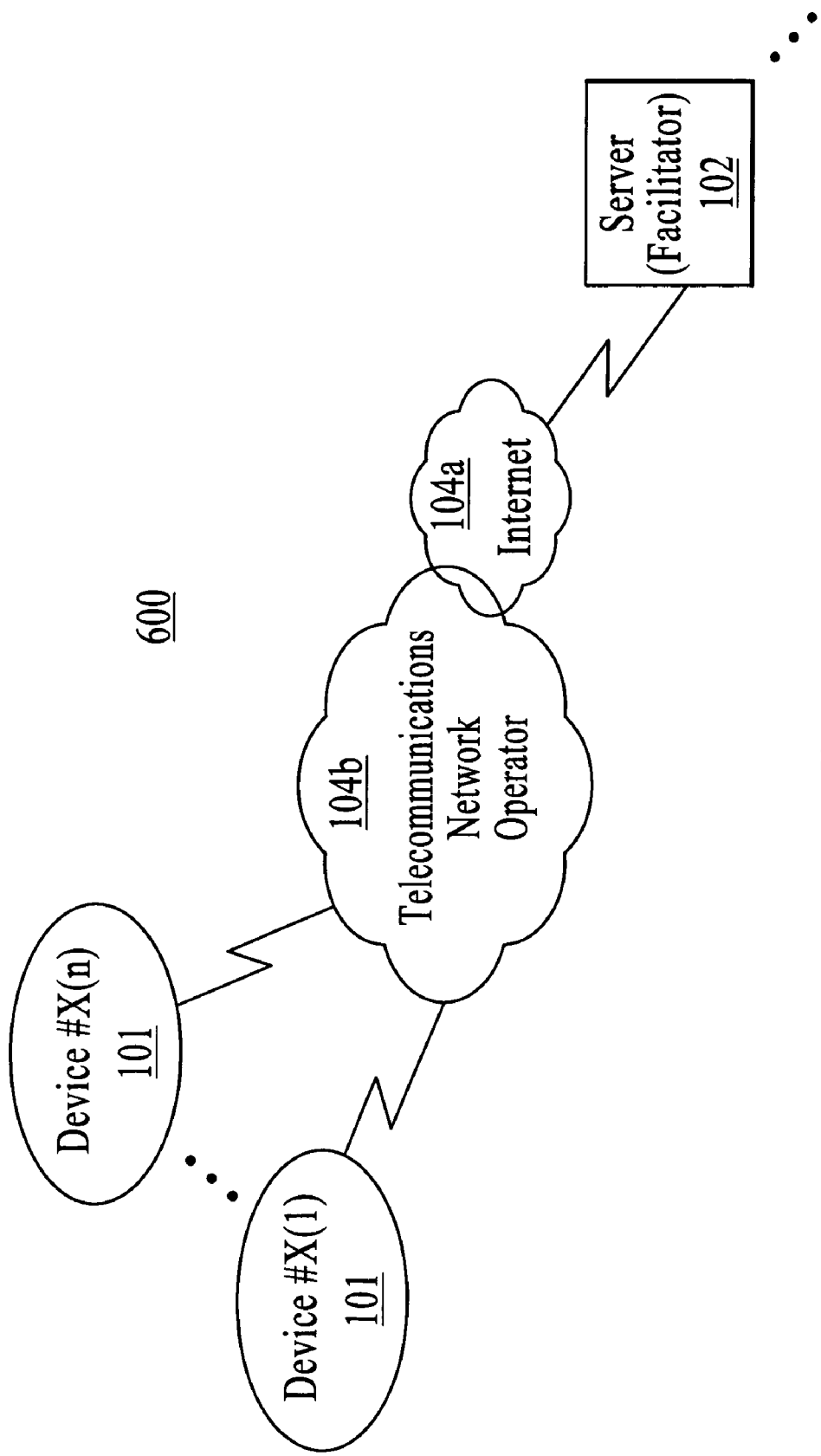
FIG. 6 is a block diagram of an AMC system, under an alternative embodiment.

Some examples follow of alternative AMC system configurations that include the facilitator and client described above. FIG. 6 is a block diagram of an AMC system 600, under an alternative embodiment. The AMC system 600 includes a server or other processor-based device hosting the facilitator 102. The facilitator 102 communicates with one or more client devices 101 to provide AMC system functions among the client devices 101 via network couplings that include the Internet 104a and a telecommunications network 104b. The telecommunications network 104b includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

Figure 7:
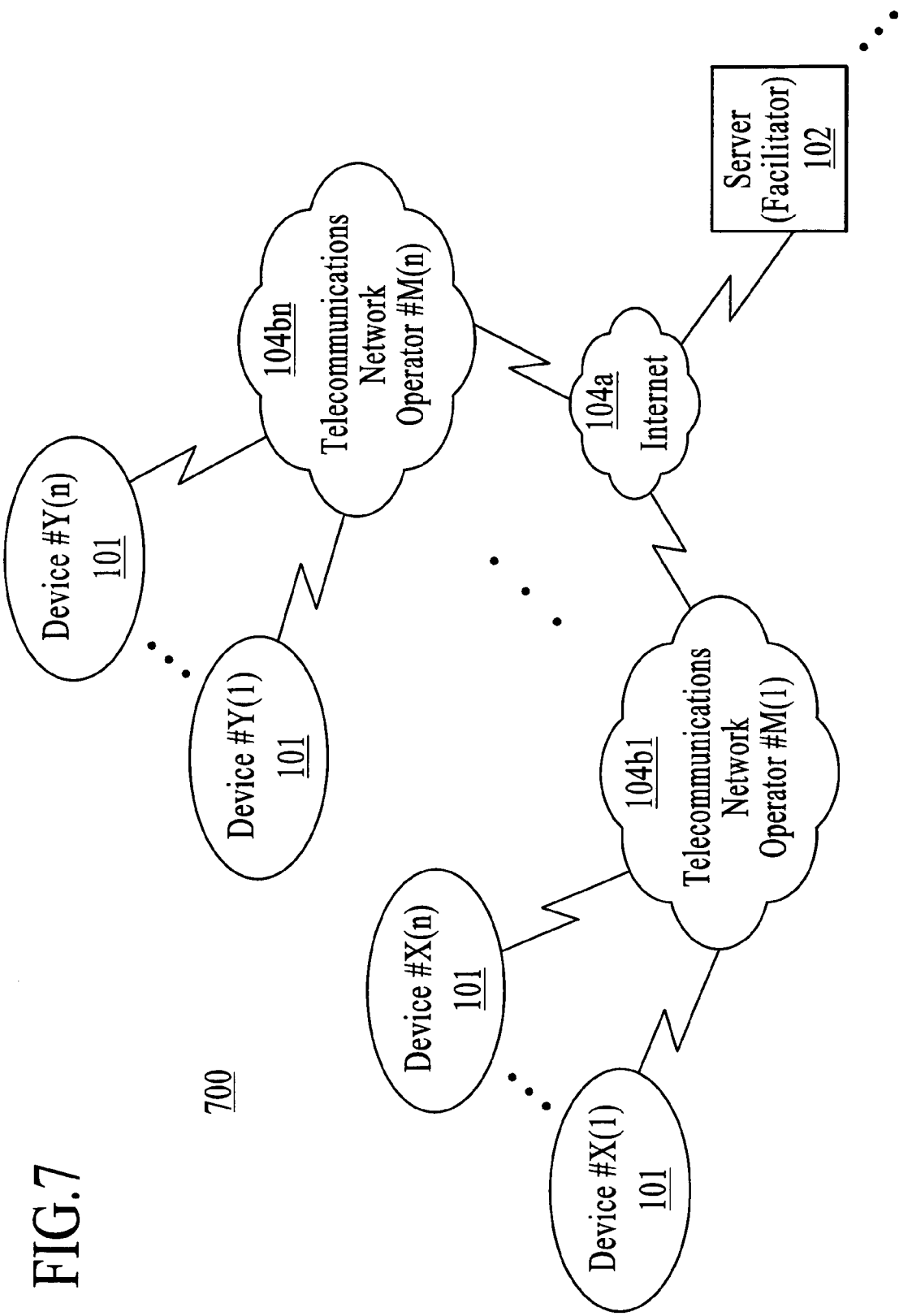
FIG. 7 is a block diagram of an AMC system, under another alternative embodiment.

FIG. 7 is a block diagram of an AMC system 700, under another alternative embodiment. The AMC system 700 includes a server hosting the facilitator 102, and the facilitator 102 communicates with one or more client devices 101 to provide AMC system functions among the client devices 101 via network couplings that include the Internet 104a and/or multiple telecommunications networks 104b1 to 104bn. The telecommunications networks 104b1-104bn are as described above with reference to FIG. 6, but are not so limited.

Figure 8:
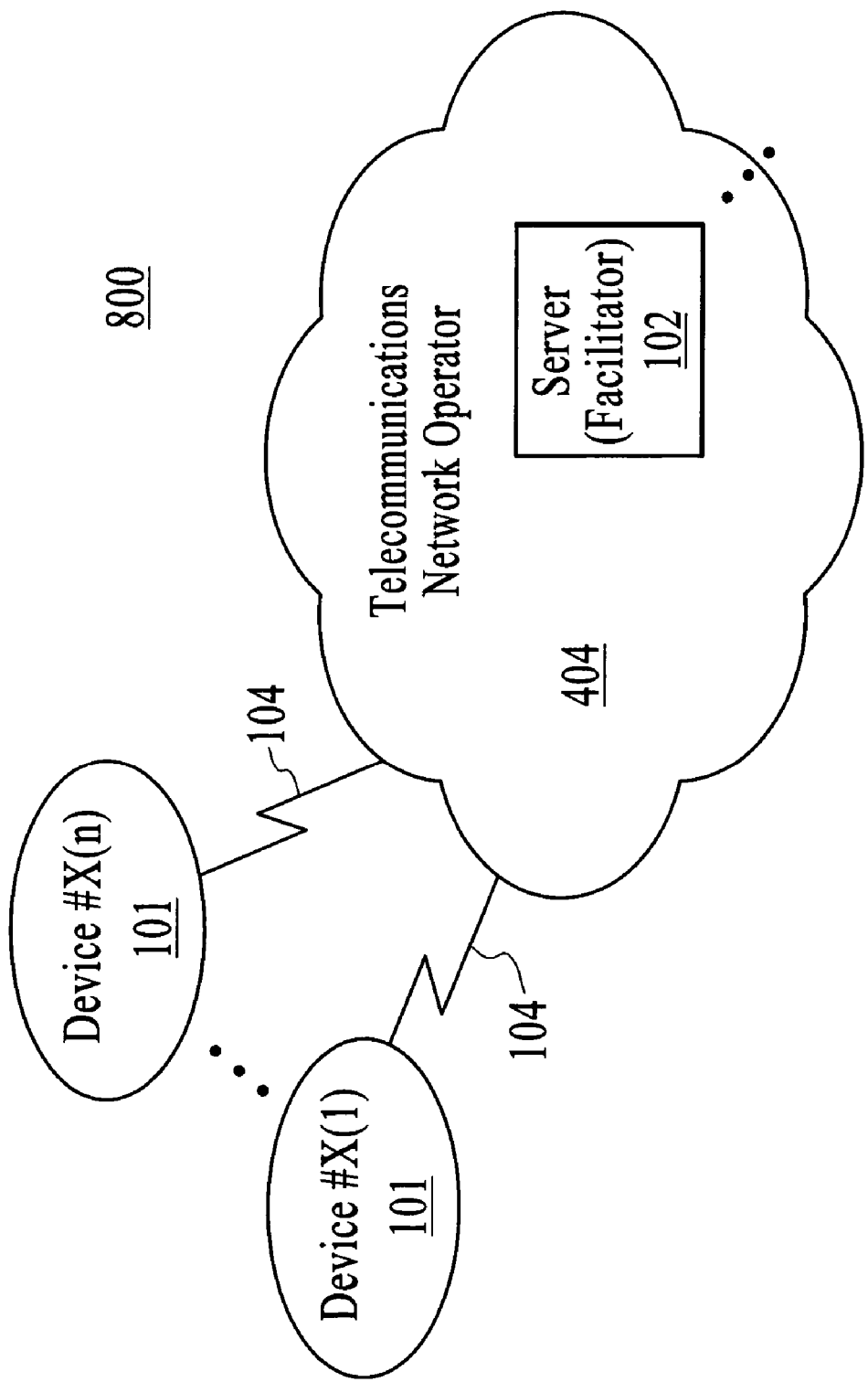
FIG. 8 is a block diagram of an AMC system, under yet another alternative embodiment.

FIG. 8 is a block diagram of an AMC system 800, under yet another alternative embodiment. The AMC system 800 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited.

Figure 9:
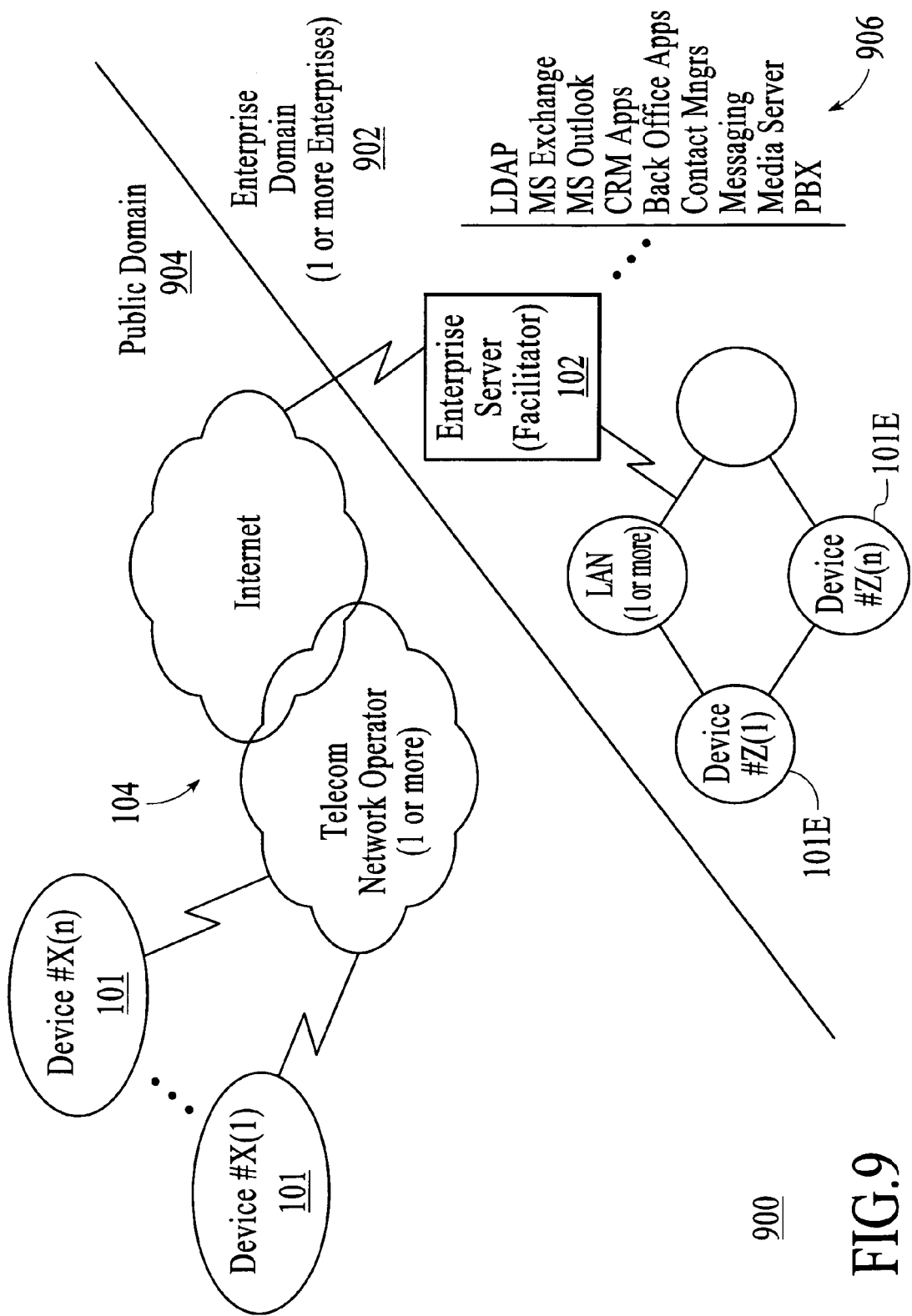
FIG. 9 is a block diagram of an AMC system in an enterprise domain, under another alternative embodiment.

FIG. 9 is a block diagram of an AMC system 900 in an enterprise domain, under another alternative embodiment. The AMC system 900 includes a server hosting the facilitator 102 where the server/facilitator 102 is a component of a corporate or enterprise infrastructure 902. The server can host numerous additional applications 906 in addition to the facilitator 102 or can be dedicated to the facilitator 102. The facilitator 102 communicates with one or more client devices 101 in the public domain 904 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 902 to provide AMC system functions among the client devices 101E as described below. The client devices 101E in the enterprise domain 902 are shown coupled to one or more LANs, but are not so limited.

Figure 10:
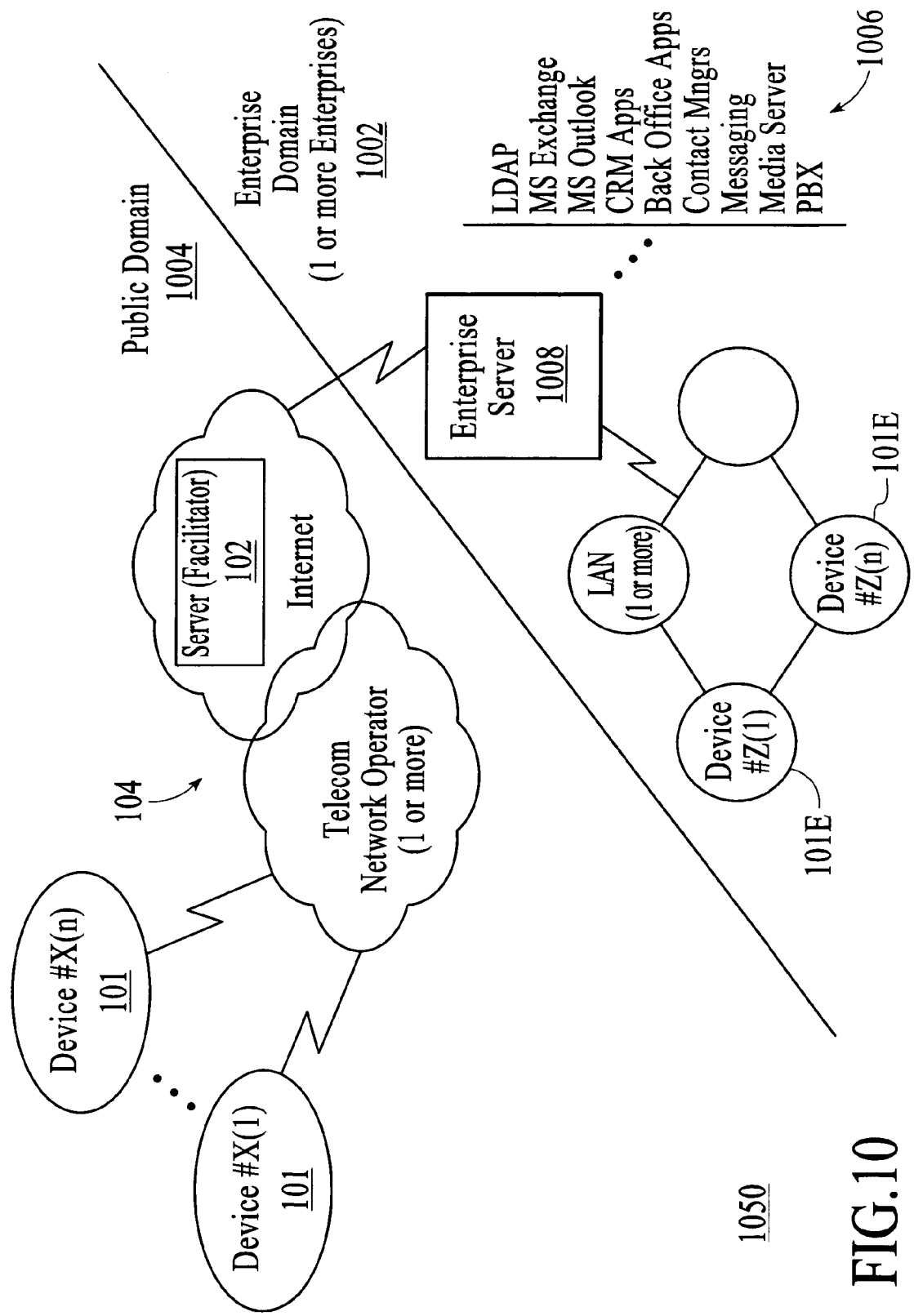
FIG. 10 is a block diagram of an AMC system in a public domain coupled across components of an enterprise domain, under another alternative embodiment.

FIG. 10 is a block diagram of an AMC system 1050 in a public domain coupled across components of an enterprise domain, under another alternative embodiment. The AMC system 1050 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 1004 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 1002 including, for example, one or more client devices 101E, one or more enterprise servers 1008, and one or more LANs. The facilitator 102 provides AMC system functions among the client devices 101E as described below. The client devices 101E in the enterprise domain 1002 are shown coupled to one or more LANs, but are not so limited.

As an alternative to the couplings of this AMC system 1000, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 11:
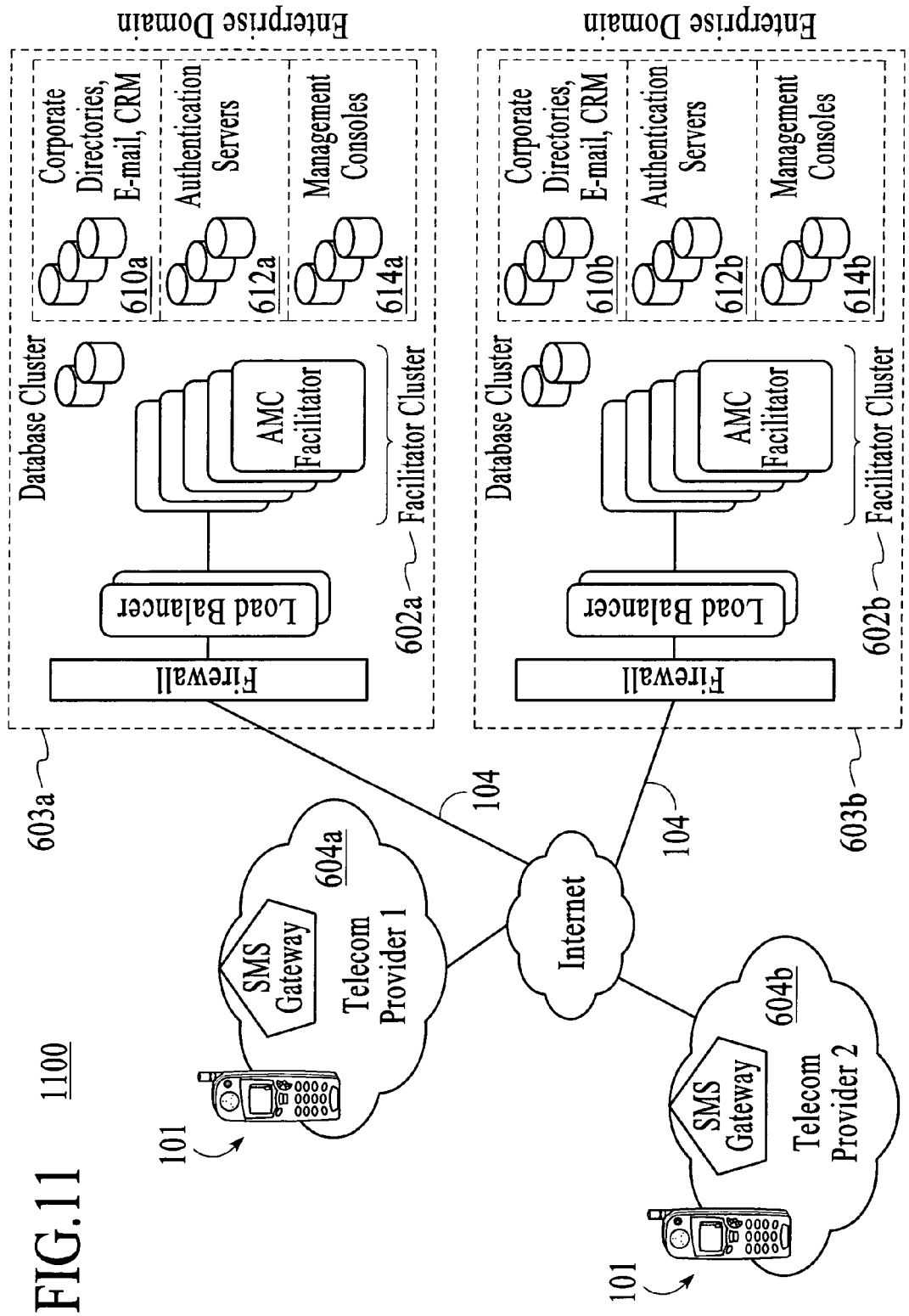
FIG. 11 is a block diagram of an AMC system in an enterprise domain, under still another alternative embodiment.

FIG. 11 is a block diagram of an AMC system 1100 in an enterprise domain, under still another alternative embodiment. The AMC system 1100 includes one or more facilitators that form facilitator clusters 1102a and 1102b within each of a number of enterprise domains 1103a and 1103b. Facilitators of the facilitator clusters 1102a and 1102b communicate with one or more client devices 101 to provide AMC system functions among the client devices 101 via network couplings 104. The network couplings 104 include, for example, at least one of the Internet and multiple telecommunication service providers 1104a and 1104b, but can include any number/type of couplings. The facilitators also couple with at least one of corporate directory servers and/or electronic mail (email) servers 1110a/1110b, authentication servers 1112a/1112b, and management consoles 1114a/1114b of the enterprise domains 1103a/1103b, but are not so limited.

Figure 12:
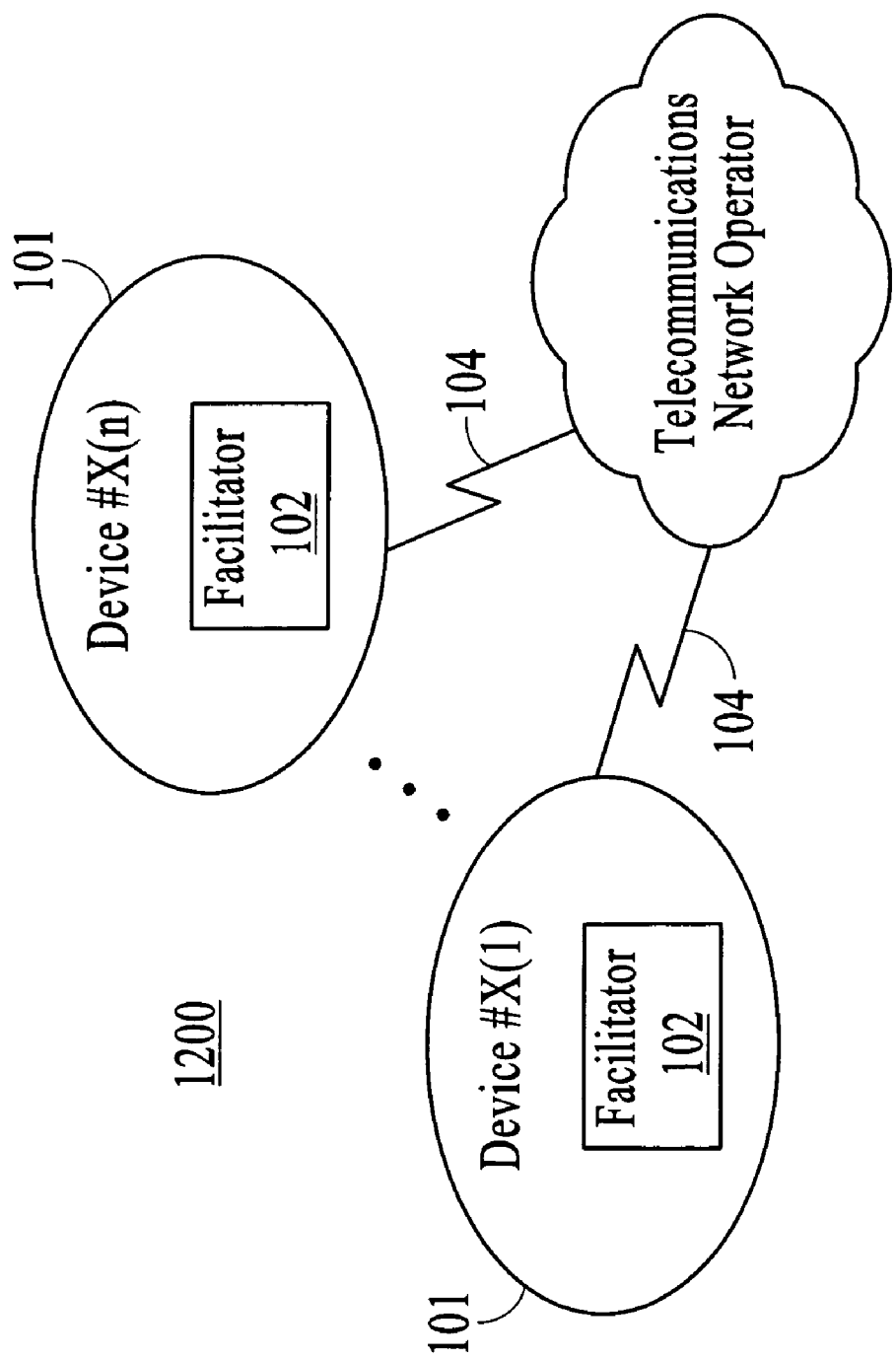
FIG. 12 is a block diagram of an active mobile collaboration (AMC) system, under an embodiment.

FIG. 12 is a block diagram of an active mobile collaboration (AMC) system 1200, under an embodiment. The AMC system 1200 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

The communications systems described herein include a method comprising, receiving a message at an inbox of a client device, wherein the message includes a melt command, authenticating a source of the message, and automatically deleting client state information of the client device in response to determining the message is from an authenticated source.

In an embodiment of a method, the authenticating includes, parsing the message to determine a key, and authenticating the source by comparing the key of the message to information previously received.

In an embodiment of a method, the key includes a pseudo-random number.

In an embodiment of a method, the key is a Globally Unique Identifier (GUID).

In an embodiment, the method further comprises determining a connectivity state of the client device.

In an embodiment, the method further comprises transmitting the message from a host server when the connectivity state of the client device is connected with the host server.

In an embodiment, the method further comprises, when the connectivity state of the client device is a persistent connection state with a host server, detecting a coupling of the client device with the host server, and detecting an attempt by the client device to authenticate with the host server and, in response, transmitting the message.

In an embodiment, the method further comprises pushing the message to the client device, wherein the message is an application-directed message, wherein the source is a host server.

In an embodiment of a method, the application-directed message includes a Short Message Service (SMS) message, an electronic mail (email) message, a device-specific electronic message, a Wireless Application Protocol (WAP) push message, a Blackberry push message, and a device-specific push message.

In an embodiment, the method further comprises removing a session maintained by the source on behalf of the client device.

In an embodiment, the method further comprises, when unable to verify a session between the client device and the host server, detecting an attempt by the client device to authenticate with the host server and, in response, transmitting the message.

In an embodiment of a method, the message is a push message.

In an embodiment, the method further comprises, transmitting the message to the client device, wherein the transmitting includes pushing the message to the client device.

In an embodiment of a method, the message includes a Short Message Service (SMS) message, an electronic mail (email) message, a device-specific electronic message, and a device-specific push message.

In an embodiment, the method further comprises receiving an electronic instruction to inactivate the device.

In an embodiment, the method further comprises re-authenticating the client device, wherein the re-authenticating re-synchronizes the client state information reinstated on the client device.

In an embodiment, the method further comprises re-provisioning the client device, wherein the re-provisioning reinstates the client state information on the client device.

In an embodiment of a method, the re-provisioning comprises, receiving a re-provisioning message at the inbox of the client device, automatically transferring an application to the client device in response to selection of the re-provisioning message, and automatically launching the application upon receipt at the client device, the launching including re-configuring the client device and re-synchronizing the client device.

In an embodiment, the method further comprises transmitting the re-provisioning message to the client device, wherein the transmitting includes pushing the message to the client device.

In an embodiment of a method, the re-provisioning message includes a Short Message Service (SMS) message, an electronic mail (email) message, a Wireless Application Protocol (WAP) push message, a Blackberry push message, a device-specific electronic message, and a device-specific push message.

In an embodiment of a method, the re-provisioning message includes one or more of electronic provisioning information of the source device and user information of a user of the client device.

In an embodiment of a method, the provisioning information includes a Uniform Resource Locator (URL) for locating the source device and its access mechanism.

In an embodiment of a method, the provisioning information includes information of one or more of a host name of the source device of the re-provisioning message, a provisioning port, an identification of the client device, user information, a port for remote couplings via a Web browser, a device access point string, a security level of the coupling, and a string agreed upon by the source device and the client device to indicating the provisioning URL.

In an embodiment of a method, the source device is one or more of a provisioning server, at least one server hosting the provisioning server, a proxy server coupled to the provisioning server, and a load balancer coupled to the provisioning server.

In an embodiment of a method, the selection of the re-provisioning message includes user selection of a component of the message.

In an embodiment of a method, the component of the re-provisioning message includes a Uniform Resource Locator (URL) for a source of the message.

In an embodiment of a method, automatically transferring comprises, launching a browser of the client device, and forming a coupling with the source device.

In an embodiment of a method, automatically transferring comprises downloading the application to the client device using a browser of the client device.

In an embodiment of a method, the configuring comprises, searching the inbox and locating the message, parsing the message for one or more of electronic provisioning information and user information of a user of the client device.

In an embodiment of a method, provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

The communications systems described herein include a system comprising, a server, wherein the server is coupled to an enterprise and a communication network that includes a client device, and a melting component coupled to the server and configured to transfer a message to the client device, wherein the message includes a melt command, wherein the client device is configured to authenticate a source of the message, wherein the client device is configured to automatically delete client state information of the client device in response to determining the message is from an authenticated source.

In an embodiment of a system, the authenticating includes, parsing the message to determine a key, and authenticating the source by comparing the key of the message to information previously received.

In an embodiment of a system, at least one component of the system is configured to determine a connectivity state of the client device.

In an embodiment of a system, at least one component of the system is configured to push the message from a host server when the connectivity state of the client device is connected with the host server.

In an embodiment of a system, at least one component of the system is configured to, when the connectivity state of the client device is a persistent connection state with a host server, detect a coupling of the client device with the server, and detect an attempt by the client device to authenticate with the host server and, in response, transmit the message.

In an embodiment of a system, at least one component of the system is configured to remove a session maintained by the source on behalf of the client device.

In an embodiment of a system, at least one component of the system is configured to, when unable to verify a session between the client device and the host server, detect an attempt by the client device to authenticate with the host server and, in response, transmit the message.

In an embodiment of a system, the message includes a Short Message Service (SMS) message, an electronic mail (email) message, a device-specific electronic message, and a device-specific push message.

In an embodiment of a system, at least one component of the system is configured to receive an electronic instruction to inactivate the device.

In an embodiment of a system, at least one component of the system is configured to re-authenticate the client device, wherein the re-authenticating re-synchronizes the client state information reinstated on the client device.

In an embodiment of a system, at least one component of the system is configured to re-provision the client device, wherein the re-provisioning reinstates the client state information on the client device.

In an embodiment of a system, the re-provisioning comprises, receiving a re-provisioning message at the inbox of the client device, automatically transferring an application to the client device in response to selection of the re-provisioning message, and automatically launching the application upon receipt at the client device, the launching including re-configuring the client device and re-synchronizing the client device.

In an embodiment of a system, at least one component of the system is configured to transmit the re-provisioning message to the client device, wherein the transmitting includes pushing the message to the client device, wherein the re-provisioning message includes one or more of electronic provisioning information of the source device and user information of a user of the client device.

In an embodiment of a system, the selection of the re-provisioning message includes user selection of a component of the message.

In an embodiment of a system, automatically transferring comprises downloading the application to the client device using a browser of the client device.

In an embodiment of a system, the configuring comprises, searching the inbox and locating the message, and parsing the message for one or more of electronic provisioning information and user information of a user of the client device.

The communications systems described herein include a computer readable media including executable instructions which, when executed in a processing system, automatically melts a client device by, receiving a message at an inbox of a client device, wherein the message includes a melt command, authenticating a source of the message, and automatically deleting client state information of the client device in response to determining the message is from an authenticated source.

The communications systems described herein include a method comprising, receiving a message at an inbox of a client device, automatically transferring an application to the client device in response to selection of the message, and automatically launching the application upon receipt at the client device, the launching including configuring the client device.

In one embodiment of a method, the message is a push message.

In one embodiment of a method, a provisioning server pushes the push message to the client device.

In an embodiment, the method further comprises transmitting the message to the client device, wherein the transmitting includes pushing the message to the client device.

In one embodiment of a method, the client device is a mobile device.

In one embodiment of a method, the message includes a Short Message Service (SMS) message, an electronic mail (email) message, a Wireless Application Protocol (WAP) push message, a Blackberry push message, a device-specific electronic message, and a device-specific push message.

In one embodiment of a method, the message includes one or more of electronic provisioning information of the source device and user information of a user of the client device.

In one embodiment of a method, the provisioning information includes location information of the application.

In one embodiment of a method, the provisioning information includes a Uniform Resource Locator (URL) for locating the source device and its access mechanism.

In one embodiment of a method, the provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

In one embodiment of a method, the message includes text.

In one embodiment of a method, the source device is one or more of a provisioning server, at least one server hosting the provisioning server, a proxy server coupled to the provisioning server, and a load balancer coupled to the provisioning server.

In an embodiment, the method further comprises determining the client device fails to receive the message, and re-initiating the transferring in response to the determining.

In one embodiment of a method, the selection of the message includes user selection of a component of the message.

In one embodiment of a method, the component of the message includes a Uniform Resource Locator (URL) for a source of the message.

In one embodiment of a method, automatically transferring comprises, launching a browser of the client device, and forming a coupling with the source device.

In one embodiment of a method, automatically transferring comprises selecting the application from a plurality of applications.

In one embodiment of a method, the selecting uses information from a user of the client device and identification information of the client device.

In one embodiment of a method, a user of the client device performs the selecting.

In one embodiment of a method, the source device performs the selecting using information of one or more of a service provider of the client device and one or more characteristic of the client device.

In one embodiment of a method, the at least one characteristic includes one or more of operating system, model, screen size, connection type, memory, language, and language version of the client device.

In one embodiment of a method, automatically transferring comprises downloading the application to the client device using a browser of the client device.

In one embodiment of a method, the configuring comprises, searching the inbox and locating the message, and parsing the message for one or more of electronic provisioning information of the source device and user information of a user of the client device.

In one embodiment of a method, the provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

In an embodiment, the method further comprises receiving device information, the device information including one or more of a name of the client device, a model of the client device, a telephone number of the client device, a service provider of service of the client device, and electronic identification information of the client device.

In one embodiment of a method, receiving comprises sending via at least one portal.

In an embodiment, the method further comprises transferring the message to the client device using the user information.

In an embodiment, the method further comprises generating an archive resource file that includes information of the client device.

In one embodiment of a method, the information of the client device in the active resource file includes one or more of client devices supported, client device configurations, client device documentation, and client device applications.

In an embodiment, the method further comprises seeding the source device using information of the archive resource file.

In one embodiment of a method, the source device is lacking information of the client device prior to the seeding.

In an embodiment, the method further comprises, periodically updating the archive resource file to generate an updated archive resource file, and periodically re-seeding the source device with the updated archive resource file.

In an embodiment, the method further comprises transmitting a notification to the client device, the notification including information of an updated version of the application.

In one embodiment of a method, the message includes the notification, and the application includes the updated application.

In an embodiment, the method further comprises synchronizing user data on the client device with user data on a source device.

The communications systems described herein include a system comprising, a server, wherein the server is coupled to an enterprise and a communication network that includes a client device, and a provisioning component coupled to the server and configured to transfer a message to the client device, wherein the client device is configured to couple with the provisioning component and the provisioning component is configured to automatically transfer an application to the client device in response to selection by a user of a portion of the message received at an inbox of the client device, the application configured to automatically launch upon receipt at the client device, the launching including configuring the client device and synchronizing user data on the client device with user data on the server.

In an embodiment of a system, the provisioning server is configured to push the message to the client device, wherein the message includes a Short Message Service (SMS) message, an electronic mail (email) message, a Wireless Application Protocol (WAP) push message, a Blackberry push message, a device-specific electronic message, and a device-specific push message.

In an embodiment of a system, the message includes one or more of electronic provisioning information of the source device and user information of a user of the client device.

In an embodiment of a system, the provisioning information includes location information of the application.

In an embodiment of a system, the provisioning component is configured to determine the client device fails to receive the message and re-initiate the transferring in response to the determining.

In an embodiment of a system, the selection of the message includes user selection of a component of the message.

In an embodiment of a system, automatically transferring comprises selecting the application from a plurality of applications.

In an embodiment of a system, the selecting uses information from a user of the client device and identification information of the client device.

In an embodiment of a system, a user of the client device performs the selecting.

In an embodiment of a system, the source device is configured to perform the selecting using information of one or more of a service provider of the client device and one or more characteristic of the client device, wherein the at least one characteristic includes one or more of operating system, model, screen size, connection type, memory, language, and language version of the client device.

In an embodiment of a system, automatically transferring comprises downloading the application to the client device using a browser of the client device.

In an embodiment of a system, the configuring comprises, searching the inbox and locating the message, and parsing the message for one or more of electronic provisioning information of the source device and user information of a user of the client device.

In an embodiment of a system, the provisioning information includes information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

In an embodiment of a system, one or more of the server and the provisioning component if configured to generate an archive resource file that includes information of the client device, wherein the information of the client device in the active resource file includes one or more of client devices supported, client device configurations, client device documentation, and client device applications.

In an embodiment of a system, one or more of the server and the provisioning component is configured to seed the source device using information of the archive resource file.

In an embodiment of a system, one or more of the server and the provisioning component is configured to transmit a notification to the client device, the notification including information of an updated version of the application, wherein the message includes the notification, and the application includes the updated application.

In an embodiment, the system further comprises synchronizing user data on the client device with user data on a source device.

The communications systems described herein include a computer readable media including executable instructions which, when executed in a processing system, automatically provisions a client device by, receiving a message at an inbox of the client device, automatically transferring an application to the client device in response to selection of the message, and automatically launching the application upon receipt at the client device, the launching including configuring the client device.

Aspects of the communications systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communications systems include: microcontrollers with memory (such as electronically erasable programmable read-only memory (EEPROM)), embedded microprocessors, firmware, software, etc. Furthermore, aspects of the communications systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the communications systems is not intended to be exhaustive or to limit the systems and methods described to the precise form disclosed. While specific embodiments of, and examples for, the communications systems are described herein for illustrative purposes, various equivalent modifications are possible within the scope of other communications systems and methods, as those skilled in the relevant art will recognize. The teachings of the communications systems provided herein can be applied to other processing systems and methods, not only for the systems and methods described above.

The elements and acts of the various embodiments described above can be combined to provide further embodiments. These and other changes can be made to the communications systems in light of the above detailed description.

In general, in the following claims, the terms used should not be construed to limit the communications systems to the specific embodiments disclosed in the specification and the claims, but should be construed to include all systems that operate under the claims. Accordingly, the communications systems are not limited by the disclosure, but instead the scope of the communications systems is to be determined entirely by the claims.

While certain aspects of the communications systems are presented below in certain claim forms, the inventors contemplate the various aspects of the communications systems in any number of claim forms. Accordingly, the inventors reserve the right to add additional claims after filing the application to pursue such additional claim forms for other aspects of the communications systems.

What is claimed is:

1. A method, comprising:
receiving a first data component from a facilitator wherein the first data component includes data representative of an identification of the facilitator as an authenticated source;
storing the first data component on a client device;
storing client state information comprising enterprise information of a host enterprise on the client device;
receiving, from the facilitator, a message at a common inbox of the client device, wherein the message includes a melt command, the first data component, and a second data component, wherein the second data component comprises data to enable identification of an application for parsing the message and data to enable searching for the message in the common inbox;

identifying an application for parsing the message in the common inbox in accordance with the second data component;

parsing the message by the application identified in accordance with the second data component, determining from parsing the message that the message contains the melt command, and obtaining the first data component from the message;

authenticating a source of the message by comparing the first data component obtained from the received message with the first data component stored on the client device; and automatically deleting client state information of the client device based on the melt command in response to determining the message is from an authenticated source, wherein the deleted client state information includes the enterprise information stored on the client device.

2. The method of claim 1, wherein the first data components includes a pseudo-random number.

3. The method of claim 1, wherein the first data component comprises a Globally Unique Identifier (GUID).

4. The method of claim 1, comprising determining a connectivity state of the client device.

5. The method of claim 4, comprising transmitting the message from a host server when the connectivity state of the client device is connected with the host server.

6. The method of claim 4, comprising, when the connectivity state of the client device is a persistent connection state with a host server:

detecting a coupling of the client device with the host server; and detecting an attempt by the client device to authenticate with the host server and, in response, transmitting the message.

7. The method of claim 1, comprising pushing the message to the client device, wherein the message is an application-directed message, wherein the source is a host server.

8. The method of claim 7, wherein the pushing the application-directed message includes pushing a one of a Short Message Service (SMS) message, an electronic mail (email) message, a device-specific electronic message, a Wireless Application Protocol (WAP) push message, a Blackberry push message, or a device-specific push message.

9. The method of claim 1, comprising removing a session maintained by the source on behalf of the client device.

10. The method of claim 9, comprising, when unable to verify a session between the client device and the host server, detecting an attempt by the client device to authenticate with the host server and, in response, transmitting the message.

11. The method of claim 1, wherein the receiving said message includes receiving a push message.

12. The method of claim 1, further comprising transmitting the message to the client device, wherein the transmitting includes pushing the message to the client device.

13. The method of claim 1, wherein said receiving the message includes receiving a one of a Short Message Service (SMS) message, an electronic mail (email) message, a device-specific electronic message, or a device-specific push message.

14. The method of claim 1, comprising receiving an electronic instruction to inactivate the device.

15. The method of claim 1, comprising re-authenticating the client device, wherein the re-authenticating re-synchronizes the client state information reinstated on the client device.

16. The method of claim 1, comprising re-provisioning the client device, wherein the re-provisioning reinstates the client state information on the client device.

17. The method of claim 16, wherein the re-provisioning comprises:

receiving a re-provisioning message at the inbox of the client device;

automatically transferring an application to the client device in response to selection of the re-provisioning message; and automatically launching the application upon receipt at the client device, the launching including re-configuring the client device and re-synchronizing the client device.

18. The method of claim 17, further comprising transmitting the re-provisioning message to the client device, wherein the transmitting includes pushing the message to the client device.

19. The method of claim 17, wherein said receiving the re-provisioning message includes receiving a one of a Short Message Service (SMS) message, an electronic mail (email) message, a Wireless Application Protocol (WAP) push message, a Blackberry push message, a device-specific electronic message, or a device-specific push message.

20. The method of claim 17, wherein said receiving the re-provisioning message includes receiving one or more of electronic provisioning information of a source device or user information of a user of the client device.

21. The method of claim 20, wherein said receiving the provisioning information includes receiving a Uniform Resource Locator (URL) for locating the source device and its access mechanism.

22. The method of claim 20, wherein said receiving the provisioning information includes receiving information of one or more of a host name of the source device of the re-provisioning message, a provisioning port, an identification of the client device, user information, a port for remote couplings via a Web browser, a device access point string, a security level of the coupling, and a string agreed upon by the source device and the client device to indicating the provisioning URL.

23. The method of claim 17, wherein the source is one or more of a provisioning server, at least one server hosting the provisioning server, a proxy server coupled to the provisioning server, and a load balancer coupled to the provisioning server.

24. The method of claim 17, wherein the receiving the re-provisioning message includes user selection of a component of the message.

25. The method of claim 24, wherein the user selection of the component of the re-provisioning message includes user selection of a Uniform Resource Locator (URL) for a source of the message.

26. The method of claim 17, wherein automatically transferring comprises:

launching a browser of the client device; and forming a coupling with the source device.

27. The method of claim 17, wherein automatically transferring comprises downloading the application to the client device using a browser of the client device.

28. The method of claim 17, wherein the configuring comprises:

searching the inbox and locating the message;

parsing the message for one or more of electronic provisioning information and user information of a user of the client device.

29. The method of claim 28, wherein the provisioning information includes provisioning information of one or more of a host name of a source device of the message, wherein the source device is one or more of a server, facilitator, and endpoint of a provisioning server, a host name of a synchronization facilitator server, service provider information, a provisioning port, a synchronization port, client device information, user information, a port for remote couplings via a Web browser, a device access point, security levels of a plurality of couplings, and a string agreed upon by the source device and the client device to indicating the provisioning URL.

30. The method of claim 17, wherein the source is a load balancer coupled to a provisioning server.

31. A system comprising:
a client device operable to communicate with a server that is coupled to an enterprise and a communication network, wherein the client device is configured to host enterprise information of the enterprise;
wherein the client device is configured to receive a first data component from a facilitator wherein the first data component includes data representative of an identification of the facilitator as an authenticated source;
wherein the client device is configured to store the first data component;
wherein the client device is configured to receive a message at a common inbox, from a facilitator, wherein the message includes a melt command, the first data component, and a second data component, wherein the second data component comprises data to enable identification of an application for parsing the message and to enable searching for the message in the common inbox;
wherein the client device is configured to identify an application for parsing the message in the common inbox in accordance with the second data component;
wherein the client device is configured to employ the application identified in accordance with the second data component to parse the message, to determine the message includes the melt command, and to acquire the second data component;
wherein the client device is configured to authenticate a source of the message by comparing the first data component obtained from the received message with the first data component stored on the client device;
wherein the client device is configured to automatically delete client state information of the client device in response to determining the message is from an authenticated source; and
wherein the client state information automatically deleted includes the enterprise information stored on the client device.

32. The system of claim 31, wherein at least one component of the system is configured to determine a connectivity state of the client device.

33. The system of claim 32, wherein at least one component of the system is configured to push the message from a host server when the connectivity state of the client device is connected with the host server.

34. The system of claim 32, wherein at least one component of the system is configured to, when the connectivity state of the client device is a persistent connection state with a host server:
detect a coupling of the client device with the server; and
detect an attempt by the client device to authenticate with the host server and, in response, transmit the message.

35. The system of claim 31, wherein at least one component of the system is configured to remove a session maintained by the source on behalf of the client device.

36. The system of claim 35, wherein at least one component of the system is configured to, when unable to verify a session between the client device and the host server, detect an attempt by the client device to authenticate with the host server and, in response, transmit the message.

37. The system of claim 31, wherein the melting component is configured to transfer a message including a Short Message Service (SMS) message, an electronic mail (email) message, a device-specific electronic message, and a device-specific push message.

38. The system of claim 31, wherein at least one component of the system is configured to receive an electronic instruction to inactivate the device.

39. The system of claim 31, wherein at least one component of the system is configured to re-authenticate the client device, wherein the re-authenticating resynchronizes the client state information reinstated on the client device.

40. The system of claim 31, wherein at least one component of the system is configured to re-provision the client device, wherein the re-provisioning reinstates the client state information on the client device.

41. The system of claim 40, wherein the at least one component of the system is configured to re-provision the client device by:
receiving a re-provisioning message at the inbox of the client device;
automatically transferring an application to the client device in response to 30 selection of the re-provisioning message; and
automatically launching the application upon receipt at the client device, the launching including re-configuring the client device and re-synchronizing the client device.

42. The system of claim 41, wherein at least one component of the system is configured to transmit the re-provisioning message to the client device, wherein the transmitting includes pushing the message to the client device, wherein the reprovisioning message includes one or more of electronic provisioning information of the source device and user information of a user of the client device.

43. The system of claim 41, wherein the selection of the re-provisioning message includes user selection of a component of the message.

44. The system of claim 41, wherein at least one component of the system is configured to automatically transfer by downloading the application to the client device using a browser of the client device.

45. The system of claim 41, wherein the at least one component of the system is configured to configure by:
searching the inbox and locating the message;
parsing the message for one or more of electronic provisioning information and user information of a user of the client device.

46. A computer readable media including executable instructions which, when executed in a processing system on a client device, automatically melts client state information that comprises enterprise information at the client device by:
receiving a first data component from a facilitator wherein the first data component includes data representative of and identification of the facilitator as an authenticated source;
storing the first data component on the client device;
receiving, from the facilitator, a message at a common inbox of the client device, wherein the message includes a melt command, the first data component, and a second component, wherein the second component comprises data to enable identification of an application for parsing the message and to enable searching for the message in the common inbox;

identifying an application for parsing the message in the common inbox in accordance with the second data component;

parsing the message by the application identified in accordance with the second data component, determining from parsing the message that the message includes the melt command and acquiring the first data component from the message;

authenticating a source of the message by comparing the first data component obtained from the received message with the first data component stored on the client device; and automatically deleting client state information of the client device including automatically deleting enterprise information in response to the melt command determining the message is from an authenticated source.

* * * * *